(12) United States Patent
Samara et al.

(10) Patent No.: US 10,860,549 B2
(45) Date of Patent: Dec. 8, 2020

(54) BUILDING AND MANAGING DATA-PROCESSING ATTRIBUTES FOR MODELED DATA SOURCES

(71) Applicant: EQUIFAX, INC., Atlanta, GA (US)

(72) Inventors: Danielle Samara, Ball Ground, GA (US); Matthew Welsh, Cumming, GA (US); Naresh Chalimeda, Alpharetta, GA (US); James Reid, Cumming, GA (US); Seong Geum, Suwanee, GA (US); Paulina Galvez, Santiago (CL); Juan Maureira, Santiago (CL); Yolanda Head, Alpharetta, GA (US)

(73) Assignee: EQUIFAX INC., Atlanta, GA (US)

( * ) Notice: Subject to any disclaimer, the term of this patent is extended or adjusted under 35 U.S.C. 154(b) by 274 days.

(21) Appl. No.: 15/750,382

(22) PCT Filed: Aug. 5, 2016

(86) PCT No.: PCT/US2016/045812
§ 371 (c)(1),
(2) Date: Feb. 5, 2018

(87) PCT Pub. No.: WO2017/024236
PCT Pub. Date: Feb. 9, 2017

(65) Prior Publication Data
US 2018/0232405 A1 Aug. 16, 2018

Related U.S. Application Data

(60) Provisional application No. 62/201,303, filed on Aug. 5, 2015.

(51) Int. Cl.
*G06F 16/21* (2019.01)
*G06F 16/28* (2019.01)
(Continued)

(52) U.S. Cl.
CPC ............ *G06F 16/212* (2019.01); *G06F 16/25* (2019.01); *G06F 16/288* (2019.01); *G06Q 50/10* (2013.01)

(58) Field of Classification Search
CPC ...... G06F 16/212; G06F 16/25; G06F 16/288; G06Q 50/10
(Continued)

(56) References Cited

U.S. PATENT DOCUMENTS 6,594,672 B1 * 7/2003 Lampson ............... G06F 16/283
707/999.103
7,085,762 B2 * 8/2006 Medicke ............ G06F 16/2465
707/999.006

(Continued)

FOREIGN PATENT DOCUMENTS

EP 2827262 1/2015
WO 2011151111 12/2011

OTHER PUBLICATIONS

European Application No. EP16833939.8 , "Extended European Search Report", dated Dec. 21, 2018, 10 pages.
(Continued)

*Primary Examiner* — Phong H Nguyen
(74) *Attorney, Agent, or Firm* — Kilpatrick Townsend & Stockton LLP

(57) ABSTRACT

In some aspects, an interface is provided that has options for defining entities and attributes. A model of a remote data source is defined based on inputs received via the interface. The model includes an entity representing a data segment from the remote data source. The entity has properties, which represent fields of a data structure in the remote data source and have data type descriptors indicating data types used by the fields. The model also includes an attribute specifying a function, which uses the properties as inputs. The entity is matched to exported data from the remote data (Continued)

source. The match is performed based on the exported data elements being arranged in a hierarchy corresponding to the properties and the data elements having the data types corresponding to the data type descriptors. The attribute's function is executed using, as input data, the data elements mapped to the properties.

17 Claims, 9 Drawing Sheets

(51) Int. Cl.
*G06Q 50/10* (2012.01)
*G06F 16/25* (2019.01)
(58) Field of Classification Search
USPC .......................................... 707/722, 769, 797
See application file for complete search history.

(56) References Cited

U.S. PATENT DOCUMENTS

| | | | | |
|---|---|---|---|---|
| 8,335,779 | B2 * | 12/2012 | Keith, Jr. | G06F 16/954 |
| | | | | 707/710 |
| 8,341,592 | B2 | 12/2012 | Akkiraju et al. | |
| 8,762,934 | B2 * | 6/2014 | Sarafudinov | G06F 8/35 |
| | | | | 717/104 |
| 8,869,100 | B1 | 10/2014 | Szpak et al. | |
| 9,177,144 | B2 * | 11/2015 | Alme | G06F 16/9027 |
| 2004/0015819 | A1 * | 1/2004 | Romano-Critchley | G06F 8/20 |
| | | | | 717/102 |
| 2005/0149484 | A1 | 7/2005 | Fox et al. | |
| 2006/0149739 | A1 * | 7/2006 | Myers | G06F 21/6227 |
| | | | | 707/999.009 |
| 2010/0115620 | A1 * | 5/2010 | Alme | H04L 63/1416 |
| | | | | 726/24 |
| 2011/0213783 | A1 * | 9/2011 | Keith, Jr. | G06F 16/954 |
| | | | | 707/741 |
| 2013/0262074 | A1 | 10/2013 | Heidasch | |

OTHER PUBLICATIONS

EP16833939.8, "Office Action", dated Jan. 17, 2020, 8 pages.
International Patent Application No. PCT/US2016/045812, "International Search Report and Written Opinion", dated Nov. 30, 2016, 11 pages.
EP16833939.8, "Summons to Attend Oral Proceedings", Jun. 19, 2020, 11 pages.

* cited by examiner

FIG. 10

1000 → DATA SERVICE
Filter: search Plugin ID

| Plugin ID | Plugin Version | Format Type | Format Display Name | Support Extensions | Support Projections | Action |
|---|---|---|---|---|---|---|
| JSON | 1 | json | Document | true | false | [Edit] [X] |

[Add Data Service] [Apply]
↑
1002

FIG. 11

1100 → DATA SERVICE

Plugin ID*: java
Plugin Version*: 1

Format Type*: java
Format Display Name*: java

Support Extensions*: ○ Yes ● No
Support Projections*: ○ Yes ● No

Translator:
ID*: 1
Version*: 1    [Add +]

[Back] [Done]                    *Required

BUILDING AND MANAGING DATA-PROCESSING ATTRIBUTES FOR MODELED DATA SOURCES

CROSS-REFERENCE TO RELATED APPLICATIONS

This is a U.S. national phase under 35 U.S.C. 371 of International Patent Application No. PCT/US2016/045812, entitled "Building and Managing Data-Processing Attributes for Modeled Data Sources," filed Aug. 5, 2016, which claims priority to U.S. Provisional Application No. 62/201,303, entitled "ATTRIBUTE NAVIGATOR APPLICATION," filed Aug. 5, 2015, the entirety of which is hereby incorporated by reference herein.

TECHNICAL FIELD

This disclosure generally relates to software executed on a computer or digital data processing system that enables the creation and management of computer program code, and more particularly relates to building and managing data-processing attributes to be applied to datasets obtained from remote or inaccessible data sources.

BACKGROUND

Data-processing systems may be used to generate output data for analytical purposes by analyzing and transforming input data that is stored on a data source. An example of such a data source is a database that contains identification, commercial, credit, and other information about many individuals and groups around the world or in a particular geographic region. To configure the data-processing system to analyze and transform the input data, a user of the data-processing system may specify a set of criteria and data-processing attributes, as well as desired formats of the responsive data to be delivered, to a programmer. The programmer then generates code for accessing the data sources and performing the desired analysis.

This process can involve considerable manual effort in order to interpret and program the user's request into executable computer code that can operate on the relevant data source. For example, a business user may need to explain the type of information that is needed to a computer programmer. The computer programmer then writes a mathematical formula or program to perform the analysis or functions to execute on the data source in order to return the requested information. The manual effort involved in modeling, formatting, and testing programming to return results in desired form, auditing the results, and other aspects of delivering the desired results to the business user can be time-consuming and expensive.

Furthermore, accurately coding the desired functionality may require the programmer to access the underlying data from the data source. But the programmer may not have access to the data source, especially if the programmer and the business user belong to different organizations. For example, an organization that includes the business user may maintain the data source. The data source may include confidential data to which access is restricted. The user who needs the data-processing attribute may not be permitted to authorize the programmer's access to this data source. Furthermore, providing access to the data source may be impractical due to logistical constraints (e.g., size of the data source, incompatibility of the programmer's system and the system hosting the data source, etc.).

SUMMARY

Aspects and examples are disclosed for building and managing data-processing attributes using models of data sources that may be remote or otherwise inaccessible to the application that builds or manages the attributes. In one example, a processor provides access to a user interface having options for defining entities and attributes. The processor defines a model of a remote data source based on inputs received via the interface. The model includes an entity representing a data segment from the remote data source. The entity has properties, which represent fields of a data structure stored in the remote data source and have data type descriptors indicating data types used by the fields of the data structure. The model also includes an attribute specifying a function, which uses the properties as inputs. The processor matches the entity to data exported from the remote data source. This match is performed based on the exported data elements being arranged in a hierarchy corresponding to the properties and the data elements having the data types corresponding to the data type descriptors. The processor executes the attribute's function using, as input data, the data elements mapped to the properties.

This illustrative example is mentioned not to limit or define the invention, but to aid understanding thereof. Other aspects, advantages, and features of the present invention will become apparent after review of the entire description and figures, including the following sections: Brief Description of the Figures, Detailed Description, and Claims.

BRIEF DESCRIPTION OF THE FIGURES

These and other features, aspects, and advantages of the present disclosure are better understood when the following Detailed Description is read with reference to the accompanying drawings.

FIG. 10 depicts an example of an interface for displaying information about a data service used with a modeled data source, according to some aspects of the present disclosure.

FIG. 11 depicts an example of an interface for configuring a data service used with a modeled data source, according to some aspects of the present disclosure.

DETAILED DESCRIPTION

Figure 1:
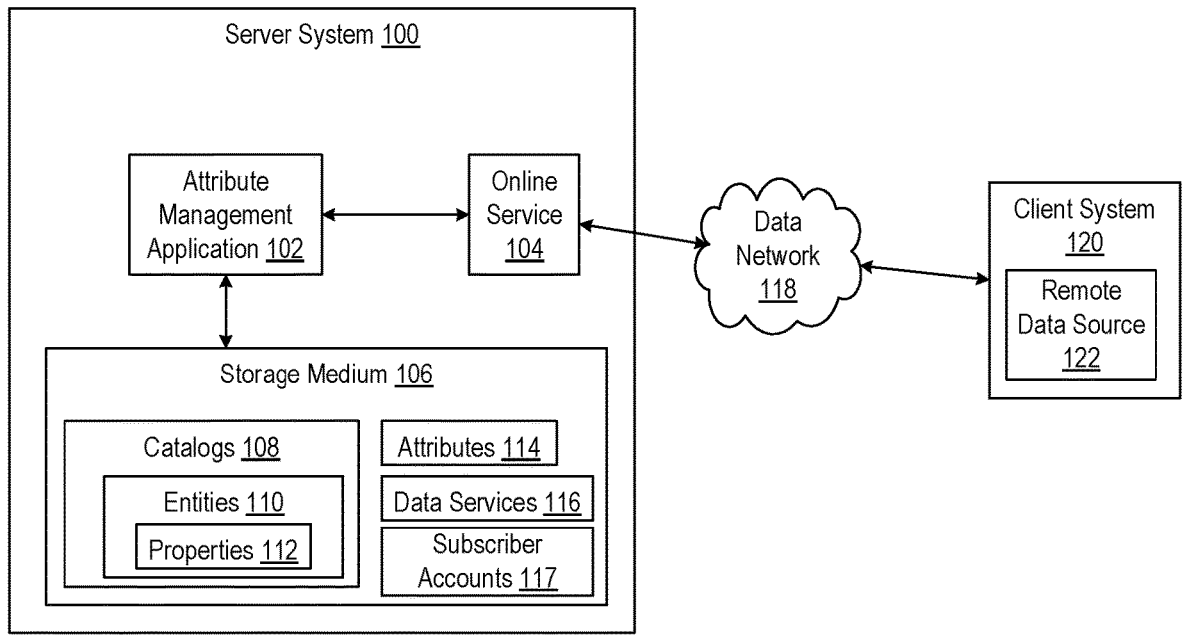
FIG. 1 depicts an example of a system in which an attribute management application can build and manage data-processing attributes to be applied to datasets obtained from remote or inaccessible data sources, according to some aspects of the present disclosure.

This disclosure describes an attribute management application for building and managing data-processing attributes to be applied to datasets that are obtained from remote or inaccessible data sources. For example, the attribute management application can provide one or more user interfaces that allow users to define attributes. These attributes can include identifications of certain datasets, as well as functions that perform definitions, predictions, statistical operations, or other executable processes that generate output data from the identified datasets.

The attribute management application can allow a user to build a model of a data source that is inaccessible to the attribute management application. The modeled data source can be used to generate program code that performs the data-processing functions identified in an attribute. The attribute management application can subsequently match the model's structure to data that has been exported from the inaccessible data source. The attribute management application can use the matching between the model and the exported data to perform the data-processing functions on the exported data. In some aspects, the attribute management application can be used to develop a model that correctly characterizes data segments and data types of a data source, as well as attributes that can be applied to the data segments, without requiring access to a specific data source to which the attribute will be applied.

For example, the attribute management application can generate a model of a data source and a data service for matching the model to data that has been exported from the data source in a certain format, such as JavaScript Object Notation ("JSON"). The data service can include one or more algorithms that receive a JSON document and determine if data elements in the JSON object corresponds to a modeled data sources having certain entities, which represent data segments, and properties, which represent fields from the data source having certain data types. After the attribute management application generates and configures the JSON data service, the JSON data service can receive a dataset. For example, the dataset may be received from an external system (e.g., a customer-controlled system), and may be a subset of data maintained at the external system. The dataset can be organized in a JSON document having a hierarchy corresponding to a hierarchy defined for various objects in the modeled data source.

The attribute management application can use the data service to match the exported JSON data to the model and to apply one or more attributes to the exported JSON data. For example, if certain attributes in the model specify certain functions to be performed with the modeled data, the attribute management application executes the functions using the exported JSON data as input data. The attribute management application returns the results that are obtained from executing the attributes on the exported JSON data. For example, the attribute management application can transmit, to a requesting client system, a list of attributes and their associated data values that have been computed from the received dataset. In this manner, the attribute management application can be used to define data-processing attributes and accurately apply the data-processing attributes to certain data from a remote resource, even if the attribute management application lacks access to the actual data source being modeled.

In some aspects, the attribute management application described herein can provide improvements over existing solutions for generating program code that applies data-processing attributes to datasets. Existing solutions for attribute management may require programmers to access underlying data sources, to which the desired data-processing attributes will be applied, in order to develop code for the data-processing attributes. Data security considerations (e.g., confidentiality of data stored on the data source) or logistical considerations (e.g., difficulties in configuring the programmer's system to communicate with the data source) may prevent this access. Thus, developing data-processing attributes for remote data sources may be infeasible or impractical when using existing solutions. But the attribute management application described herein, according to certain aspects described herein, can allow a user with little or no programming knowledge to build a model of a data source and to define attributes to be applied to data from the data source. This can reduce or remove the need for a programmer to have access to the relevant data source. Thus, in some aspects, the attribute management application can thereby provide an improved computing system for defining and applying data-processing attributes by allowing the attributes to be defined and applied more efficiently (e.g., without requiring specialized programming knowledge), without exposing secure information from the data sources to which the attributed are to be applied.

The features discussed herein are not limited to any particular hardware architecture or configuration. A computing device can include any suitable arrangement of components that provide a result conditioned on one or more inputs. Suitable computing devices include multipurpose, microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Referring now to the drawings, FIG. 1 is a block diagram illustrating an example of a server system 100 that can be used to define attributes for one or more remote data sources 122, which may be inaccessible to the server system 100. An attribute management application 102, which is executed by the server system 100, can be used to define attributes 114 based on inputs received via an online service 104 from one or more client systems 120. For example, the attribute management application 102 can generate one or more user interfaces that allow users of a client system to perform one or more of defining, managing, testing, and auditing attributes 114.

The server system 100 can include a computing device or group of computing devices configured to execute the attribute management application 102. The server system 100 can be communicatively coupled to one or more client systems 120 that can be accessed by one or more users. A client system 120 can include a remote data source 122, as depicted in FIG. 1, can be configured to access the remote data source 122, or can access another data-processing system that processes data stored in the remote data source 122.

The attribute management application 102 can include executable instructions for modeling one or more remote data sources 122 and generating data-processing attributes that can be applied to data exported from a remote data source 122. For example, the server system 100 can include, or can otherwise access, a storage medium 106. The storage medium 106 can store one or more of catalogs 108, attributes 114, and data services 116. The storage medium 106 can include one or more non-transitory computer-readable media included in or accessible to the server system 100.

A catalog 108 can be a data object that represents a remote data source 122. For example, the remote data source 122 can include credit data or other types of data. The server system 100 may be unable to access the credit data or other types of data from the remote data source 122. For example, the remote data source 122 may be protected by a firewall, and a user of a client system 120, who may be a subscriber to the online service 104, may not wish to make the remote data source 122 accessible to the server system 100 due to the remote data source 122 including confidential data. But the user may wish to use the attribute management application 102 to define, test, or otherwise manage certain functions that are to be applied to the data (e.g., statistical functions, analytical functions, etc.).

The user can access the attribute management application 102 via the online service 104 and define a meta-model corresponding to a remote data source 122. In one example, a meta-model can include a catalog 108. Additionally or alternatively, the meta-model can include one or more entities 110 associated with the catalog 108. The meta-model can also include one or more properties 112 associated with the catalog 108 as a whole, one or more properties 112 associated with individual entities 110 of the catalog, or some combination thereof. The meta-model can also include one or more attributes 114 that are defined using one or more entities, one or more properties, or some combination thereof. The meta-model can, for example, represent the remote data source 122 as a collection of entities and properties without the server system 100 having access to the data in the remote data source 122.

An entity 110 can be a data object that represents a data segment or other data portion stored in the remote data source 122. For example, if credit data in the remote data source 122 includes data segments such as trade lines, credit inquiries, and bankruptcies, the attribute management application 102 can be used to define entities 110 (e.g., a "Trade Line" entity object, an "Inquiry" entity object, and a "Bankruptcy" entity object) that represent the desired data segments from the remote data source 122. One example of a segment is a table or other data structure. Another example of a segment is a subset of the data stored in the remote data source 122 satisfying certain criteria (e.g., a subset of credit records associated with a certain location, income level, time period, or some other criterion or combination of criteria).

A property 112 can be a data object that represents a field from a data segment or other data portion stored in the remote data source 122. For example, a data segment in the remote data source 122, such as a "trade lines" segment, may include a first field with a number value for a balance associated with the trade line and second a field with a date value for a report date associated with the balance. In this example, the attribute management application 102 can be used to define properties 112 (e.g., a "Balance Amount" property object and "Date Reported" property object) that represent the first and second fields from the remote data source 122. The attribute management application 102 can allow properties to be associated at the catalog level (e.g., global properties that apply to each entity in a catalog), at the entity level (e.g., properties that are specific to a given entity), or both.

The attribute management application 102 can update the storage medium 106 to store the catalogs and associated entities and properties. The catalogs 108, entities 110, and properties 112 can be stored in any suitable format. For example, the catalogs 108, entities 110, and properties 112 may be stored in JSON format or another format that organizes a dataset in a hierarchical manner.

The attribute management application 102 can be used to build attributes 114 based on one or more stored catalogs 108, one or more stored entities 110, and one or more properties 112. An attribute 114 can include code identifying one or more functions for transforming input data into output data and identifying one or more properties 112 as inputs. For example, an attribute 114 may specify one or more properties 112, which represent credit data-related elements from the remote data source 122, and one or more functions that perform an aggregation, calculation, or derivation of the represented credit data to form a new data element. A value of an attribute 114 can be any suitable data type. Examples of suitable data types include a natural number, a floating point number, a Boolean value, a character, or a series of characters. In some aspects, a given attribute 114 may specify a function that involves combining other attributes 114. For instance, a first attribute may specify, as at least one input, a second attribute.

In some aspects, an attribute can include one or more functions for providing a definition. A definition can describe how a referenced data element is to be interpreted by an algorithm that generates scores or metrics. For instance, the function indicated by an attribute can specify a set of conditions that, when true, represent a definition of a given data element. In one example, an attribute can include a definitional function that specifies the following conditions for setting the value of a data element to "Auto Trade":

If the Industry Codes equal AL, AN, AU or FA or the Narrative Codes is one of AO, JQ Then set the value to Auto Trade In additional or alternative aspects, an attribute can be a predictor. A predictor attribute can specify a set of commands that aggregates data elements. The data elements can correspond to one or more of the properties 112, one or more other attributes 114, or some combination thereof. Continuing with the example above involving the data element having the identified value of "Auto Trade," one or more predictor commands can set mathematical operators that aggregate data elements involving the "Auto Trade" value. An example of such a predictor command is:

Count the value of Auto Trade

In additional or alternative aspects, an attribute can be used to specify a default value by setting a value of another attribute, overriding a value generated by another attribute, or both. For example, if the "count of trade" function result in a zero value, then the default value may be set to 999 using the following attribute commands:

If the Count of Auto Trade is 0

Then set Count of Auto Trade to 999

In some aspects, the attribute management application 102 can be used to apply the data-processing attributes 114, which have been defined without accessing the remote data source 122, to a set of data that has been exported from the remote data source 122 or that has been otherwise generated using the remote data source 122. The server system 100 can receive the dataset from the client system 120 via the data network 118. The attribute management application 102 can use one or more data services 116 for matching the received dataset with one or more of the entities 110. The attribute management application 102 can identify an attribute for the matched entity and execute the function identified in the attribute. The received dataset can be used as the input to this executed function. (An example of this process is described herein with respect to FIGS. 4 and 5.)

The attribute management application 102 can be accessed by one or more client systems 120 via an online service 104. In some aspects, the online service 104 can be a separate service that is executed by the server system 100 and that is accessible by the attribute management application 102. In other aspects, the online service 104 can be integrated with the attribute management application 102.

In some aspects, a user of the client system 120 can be authenticated by one or more of the attribute management application 102 and the online service 104. This authentication can verify that a user of the client system 120 is permitted to access the functionality of the attribute management application 102. In some aspects, one or more of the attribute management application 102 and the online service 104 can access subscriber accounts 117 that are stored in, for example, a database or other suitable data source. The subscriber accounts 117 can include data regarding respective users that are subscribers to an online service 104.

The server system 100 can electronically communicate with one or more client systems 120 via one or more data networks 118. For example, the online service 104 can receive requests from one or more users via the data network 118 to establish one or more subscriber accounts 117. The online service 104 can establish the subscriber accounts by storing authentication information (e.g., user names, passwords, etc.) that can be used to authenticate one or more users. Subsequent to establishing the subscriber accounts, the online service 104 that includes the attribute management application 102 can authenticate one or more users.

If the users are properly authenticated, the online service 104 can receive at least some data that has been exported from the remote data source 122 for use with the attributes 114. For example, a user can log into the online service 104 with appropriate authentication information and transmit a document, such as a JSON document or other dataset, that includes data values to be analyzed, processed, or otherwise transformed using one or more of the attributes 114.

In some aspects, the online service 104 can include or communicate with one or more of a web server module, a web services module, and an enterprise services module. For example, a web server module can be executed by a suitable processing device to provide one or more web pages or other interfaces to the client system 120. The web services module can generate this content by executing one or more analytical algorithms using information retrieved from the storage medium 106. The enterprise services module can be executed to retrieve the information from the storage medium 106.

The attribute management application 102 can be used to generate a hierarchical model of a data source. The hierarchical model includes catalogs, entities associated with the catalogs, and properties associated with the entities. The attribute management application 102 can also be used to define, manage, or otherwise use attributes that are associated with the catalogs.

Figure 2:
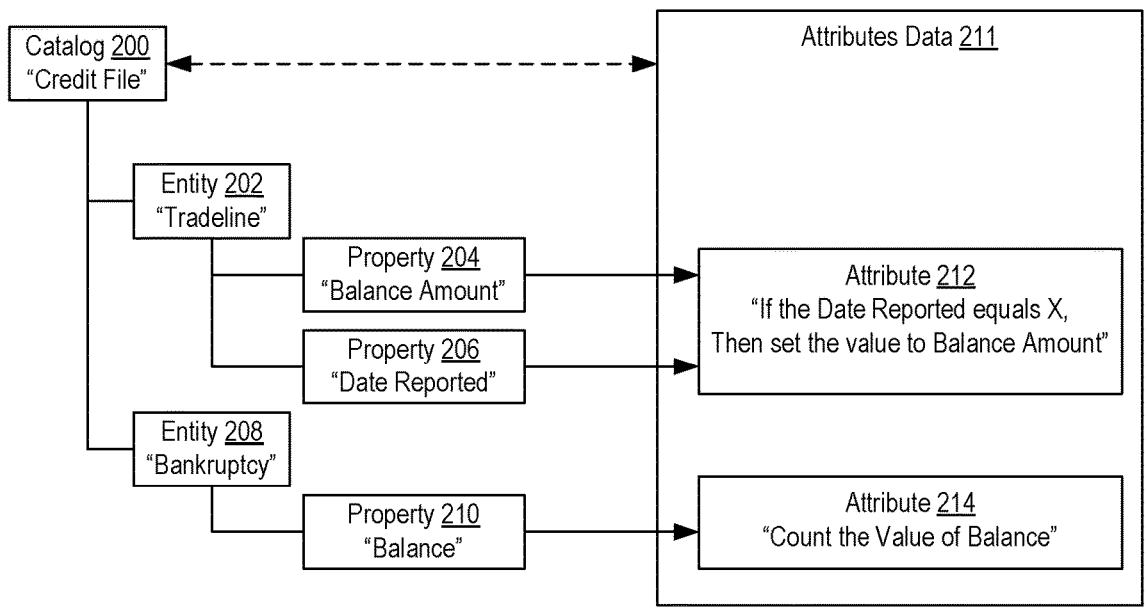
FIG. 2 depicts an example of a model of a data source generated by the attribute management application depicted in FIG. 1, according to some aspects of the present disclosure.

FIG. 2 depicts an example of a hierarchical model of a data source, which includes a catalog 200, and an example of attributes data 211 associated with the catalog 200. In the example depicted in FIG. 2, the catalog 200 forms an upper level of the hierarchy. The catalog 200 can have a user-defined name (e.g., "Credit File") that can indicate the remote data source that is modeled by the catalog 200. A second level of the hierarchy includes entities 202, 208 of the catalog 200. The entities 202, 208 can have user-defined names (e.g. "Tradeline" and "Bankruptcy") that indicate data segments from the remote data source that are modeled by the entities 202, 208. A third level of the hierarchy includes properties 204, 206 of the entity 202 and the property 210 of the entity 208. The properties 204, 206, 210 can have user-defined names (e.g., "Balance Amount," "Date Reported," and "Balance") that indicate fields from the remote data source that are modeled by the properties 204, 206, 210.

The attributes data 211 can be associated with the catalog 200. For example, the attributes data 211 can include attributes 212, 214 that use one or more properties from the catalog 200. In the example depicted in FIG. 2, the attribute 212 identifies the properties 204, 206 as inputs to a definitional function (e.g., "If the Date Reported equals X, Then set the value to Balance Amount"). The attribute 214 identifies the property 210 as an input to a predictor function (e.g., "Count the Value of Balance").

In some aspects, the attributes 212, 214 include data describing the functions in a natural language or near-natural language. The data describing the functions in a natural language or near-natural language is generated using inputs to a user interface. The attribute management application 102 generates the user interface. The online service 104 transmits the user interface to the client system 120 or otherwise provides access to the user interface by the client system 120. Natural language or near-natural language inputs received via the interface are used to define the attributes 212, 214.

For example, the attribute management application 102 may generate an interface allowing a user to input characteristics of an attribute in a natural language or near-natural language. The interface can include one or more elements for selecting or otherwise inputting an initial word or phrase (e.g., names of defined entities, properties, etc.) in a natural language or near-natural language. The interface can also include one or more elements for selecting or otherwise inputting one or more of related words, phrases, symbols, and mathematical expressions. The related words, phrases, symbols, or mathematical expressions may be generated based on the initial word or phrase inputted by the user. To define attributes, the user can select a word or phrase to generate an expression. These steps may be repeated until a complete expression is generated that identifies one or more properties and one or more functions (e.g., a statistical operation). These features can provide the ability to define attributes even if a user of the attribute management application has little or no programming knowledge or experience.

The attribute management application 102 can generate code for implementing the attributes 212, 214. In one example, the attribute management application 102 can convert a description of the attributes 212, 214, which is in a natural language or near-natural language, to suitable executable code (e.g., Java, C++, MapReduce). The executable code can be stored in the storage medium 106 for later execution or transmitted to the client system 120 for execution by the client system 120 or another data-processing system with access to the data source 122. This code can be executed to apply an attribute to a dataset, such as data exported from the data source 122 and received by the attribute management application 102 from a client system 120.

Figure 3:
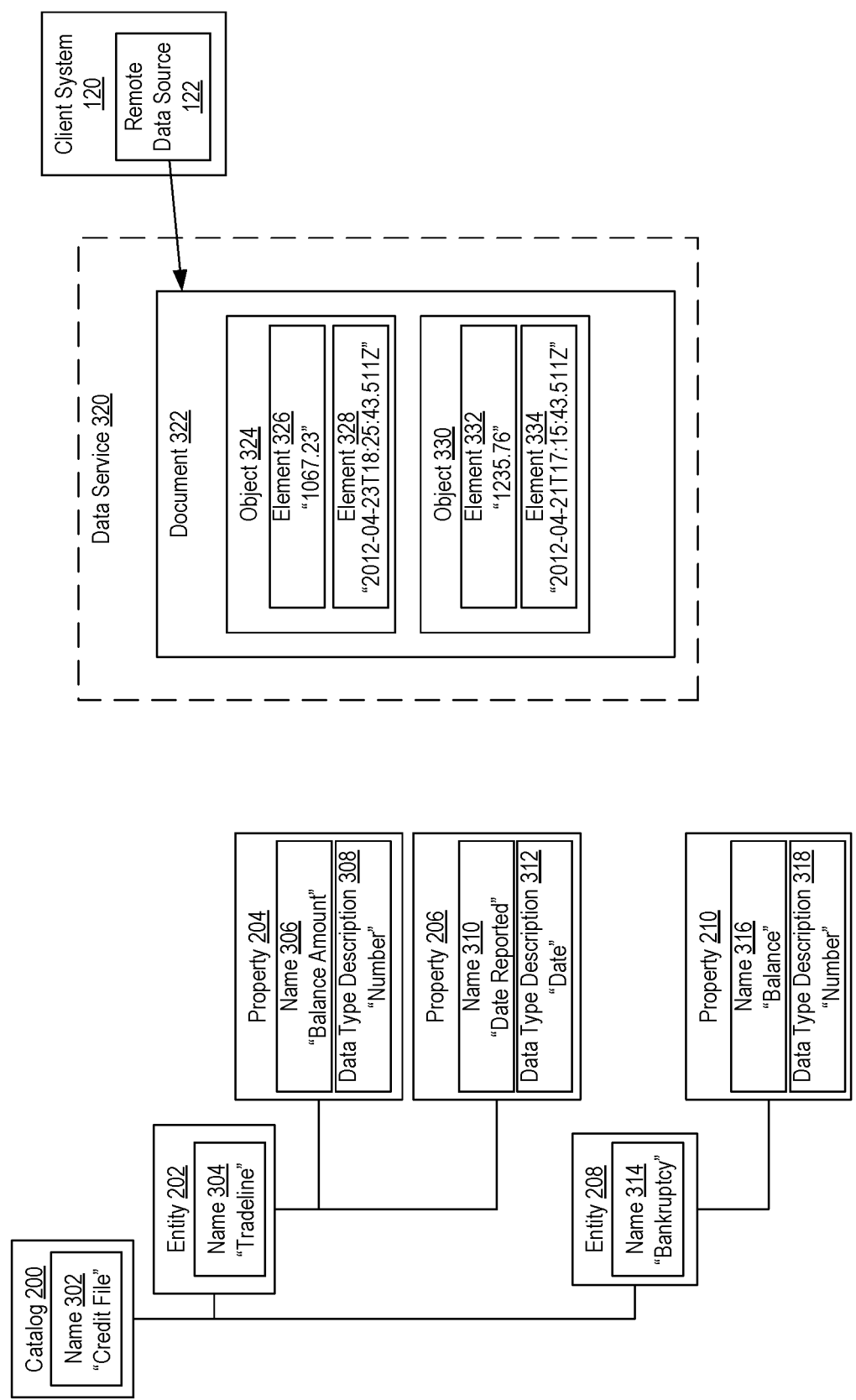
FIG. 3 depicts an example of a data service being used to match the modeled data source to data that has been exported from a remote or inaccessible data source, according to some aspects of the present disclosure.

A data service associated with the catalog 200 can be used to match a dataset received from a client system 120 with a model of a data source (e.g., the catalog 200 and its associated entities and properties). For instance, FIG. 3 depicts an example of a data service 320 matching data from a received document 322 to the catalog 200. The data service 320 can match the document 322 to the catalog 200 based, at least partially, on the hierarchical structure of the catalog 200. The document 322 can have any suitable format (such as, but not limited to, JSON) for representing hierarchically structured data.

For instance, in the example depicted in FIG. 3, the catalog 200 is a data object that includes various data elements, such as a name element 302. Entities 204 and 208 are data objects with respective name elements 304, 314. The property 204 is a data object that includes various data elements such as a name element 306 and a data type descriptor element 308. The property 204 can also include a reference indicating that the property 204 is a child data object of the catalog 200. The data type descriptor element 308 indicates that the property 204 models a data element with a "number" data type. The property 206 is a data object that includes a name element 310 and a data type descriptor element 312. The property 206 can include a reference indicating that the property 206 is a child data object of the catalog 200. The data type descriptor element 312 indicates that the property 206 models a data element with a "date" data type. The property 210 is a data object that includes a name element 316 and a data type descriptor element 318. The property 210 can include a reference indicating that the property 210 is a child data object of the catalog 200. The data type descriptor element 318 indicates that the property 210 models a data element with a "number" data type.

The data service 320 can analyze the document 322 to identify data objects with hierarchical relationships that are the same as, similar to, or otherwise correspond to one or more entities in the catalog 200. In the simplified example depicted in FIG. 3, the document 322 includes various data objects and data elements arranged in a hierarchical format. The data includes objects 324, 330. Each of the objects 324, 330 is associated with two data elements. The elements 326, 328 are children of the object 324, and the elements 332, 334 are children of the object 330. Thus, the hierarchy reflected by each of the objects 324, 330 is similar to the hierarchy of the entity 202 and the properties 204, 206 (i.e., a parent object with two child objects).

The data service 320 can also determine whether the objects 324, 330 and data elements 326, 328, 332, 334 have data types that are the same as, similar to, or otherwise correspond to one or more properties in the catalog 200. For instance, each of the elements 326, 332 has a value in a numerical format. The data service 320 can determine that the numerical data corresponds to a specified number format (e.g., a JSON "number" primitive). The data service 320 can match, based on the data type descriptor 308 for the property 204 indicating a "number" format, the elements 326, 332 to the property 204. Continuing with this example, each of the elements 328, 334 has a value in a string format. The data service 320 can determine that the string data is organized according to a specified date format. The data service 320 can match, based on the data type descriptor 312 for the property 206 indicating a "date" format, the elements 328, 334 to the property 206.

Figures 4, 5:
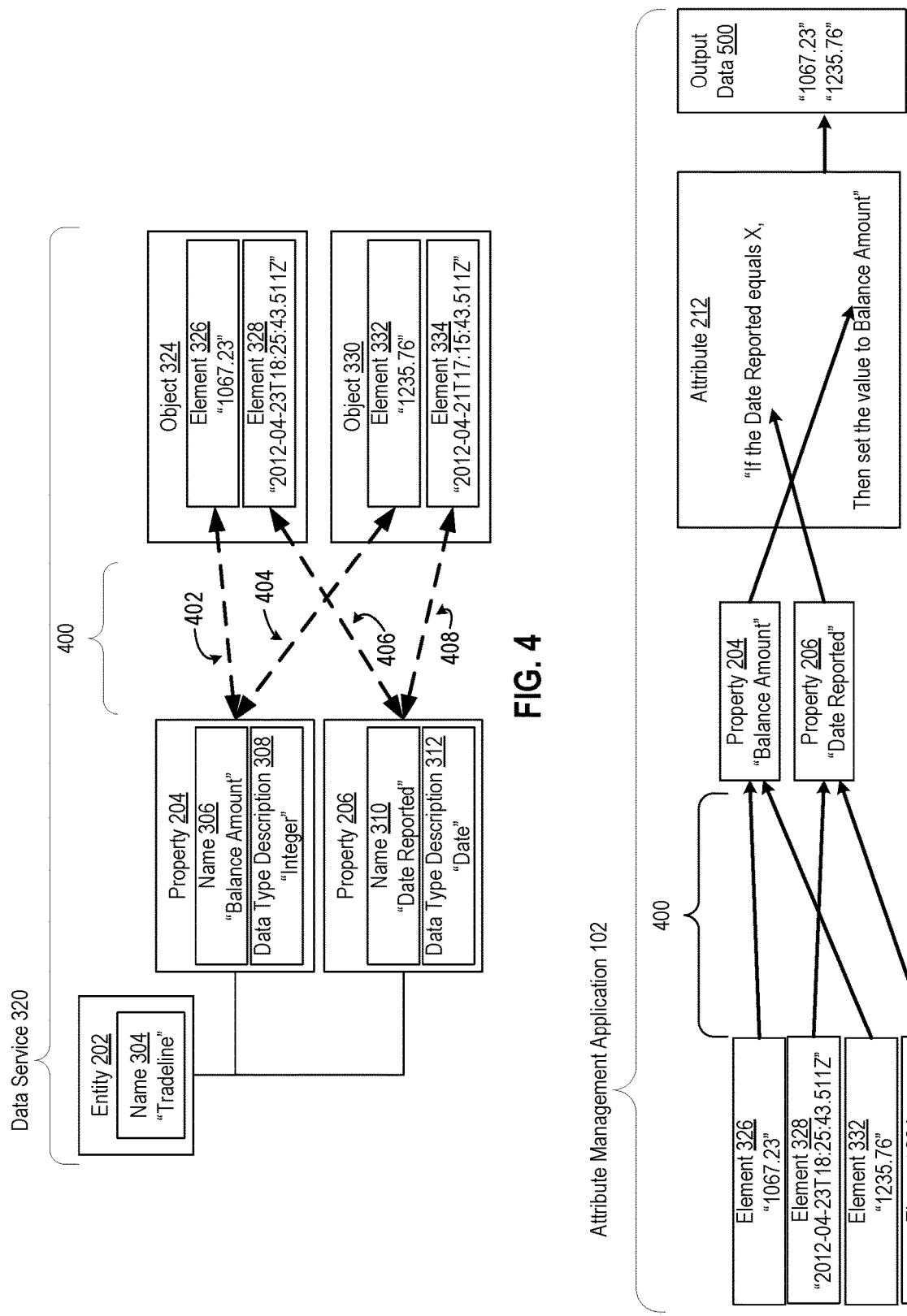
FIG. 4 depicts an example using the matching operation depicted in FIG. 3 to map data elements from the exported data to properties in the modeled data source, according to some aspects of the present disclosure.
FIG. 5 depicts an example in which the mapping depicted in FIG. 3 is used to apply data-processing attributes to the exported data, according to some aspects of the present disclosure.

The data service 320 can create a data mapping 400 that includes associations 402, 404, 406, 408, as depicted in FIG. 4. In this example, the data service 320 determines, based on matching the document 322 to the entity 202 as described above, that elements 326, 332 should be mapped to the property 204 and that elements 328, 334 should be mapped to the property 206. The data service 320 can create associations 402, 404 that map the elements 326, 332 to the property 204. The data service 320 can also create associations 406, 408 that map the elements 326, 332 to the property 206.

The data mapping 400 provided by the associations 402, 404, 406, 408 can allow the attribute management application 102 to apply one or more attributes to data in the document 322. For instance, FIG. 5 depicts an example of the attribute management application 102 applying an attribute 212 to data elements 326, 328, 332, 334 to generate output 500. In this example, the attribute management application 102 identifies a function specified in the attribute 212 and the properties 204, 206 that are specified as inputs to the function in the attribute 212. The attribute management application 102 uses the mapping 400 to select the data elements 326, 332 as input data for the "Balance Amount" and to select the data elements 328, 334 as input data for the "Date Reported."

The attribute management application 102 can access and execute code for implementing the function from the attribute 212 using the selected input data. The execution of the code can cause output data 500 to be generated from the selected input data. The output data 500 can be transmitted from the server system 100 executing the attribute management application 102 to a client system 120 from which the data elements 326, 328, 332, 334 were received. In some aspects, the output data 500 can include a list of attributes that have been applied to data in the document 322 and the values of the attributes that have been computed using the data from the document 322.

In some aspects, the attribute management application 102 can use a meta-model to apply attributes to dataset (e.g., by performing statistical calculations) and automatically convert the results to a format that is usable by a data processing system with a specific software platform. Examples of platform-specific data processing system include C++-based systems, Hadoop-based systems, etc.

In some aspects, the process described above can involve the attribute management application 102 temporarily storing the document 322, the mapping 400, and the output data 500 in the storage medium 106. The attribute management application 102 can cause one or more of the document 322, the mapping 400, and the output data 500 to be deleted from the storage medium 106 after the output data 500 is transmitted to the client system 120. For example, the mapping 400 can be dynamically generated for the purpose of applying an attribute to the data in the document 322. The mapping 400 can be deleted from the storage medium 106 after the output data 500 is transmitted to the client system 120. The output data 500 can also be deleted from the storage medium 106 after being transmitted to the client system 120. The document 322 can also be deleted from the storage medium 106 after the output data 500 is transmitted to the client system 120.

Figure 6:
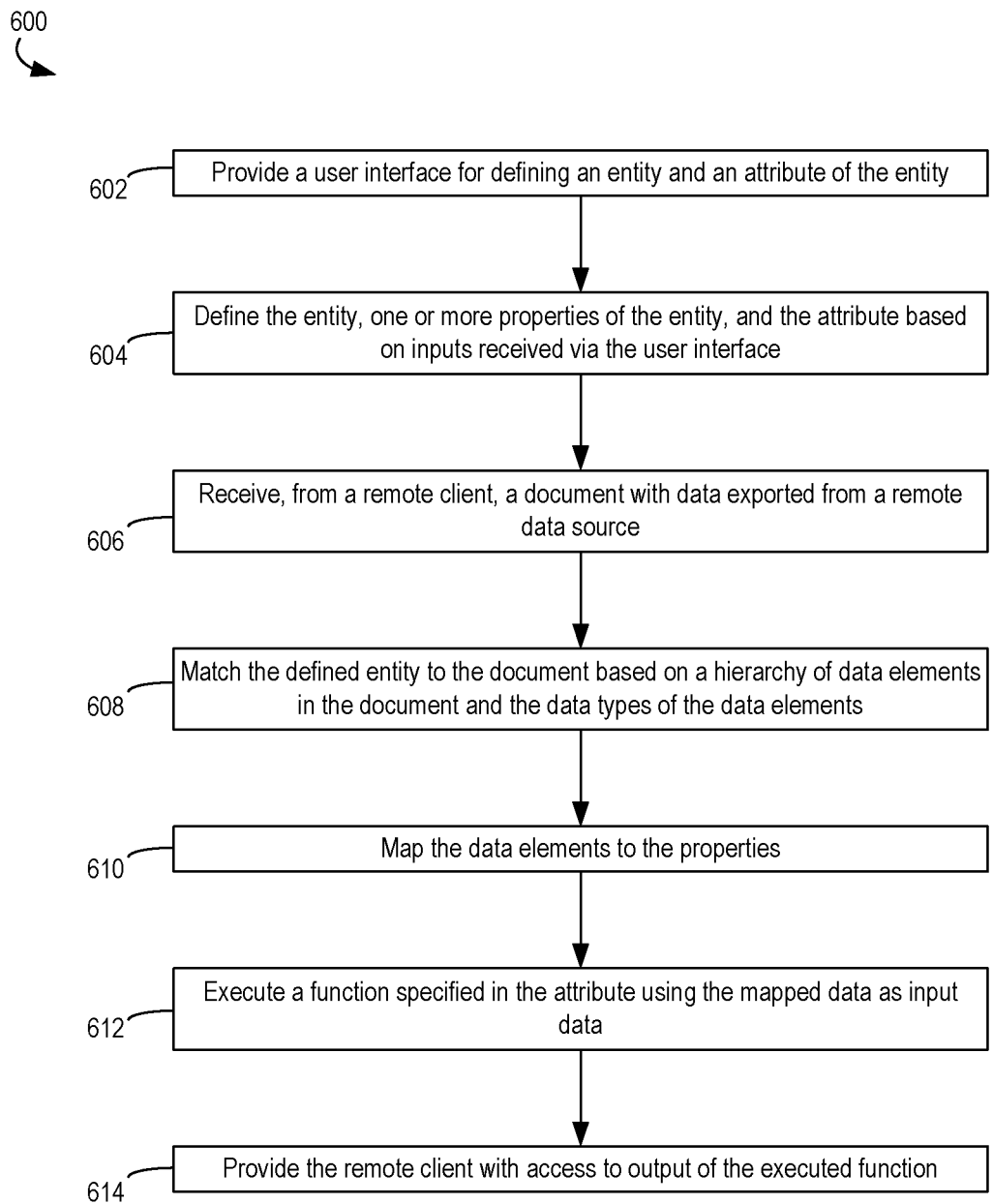
FIG. 6 depicts an example of a method for generating data-processing attributes and applying the data-processing attributes to data exported from a remote or inaccessible data source, according to some aspects of the present disclosure.

For illustrative purposes, the examples described above refer to the same client system 120 as defining a data source model (e.g., some combination of catalogs, entities, and properties), defining the attributes associated with the model, and providing the document 322 having data to which the attributes are applied. But other implementations are possible. For example, a client system 120 can include a first computing device that defines the data source model, a second computing device that defines the attributes, and a third computing device that provides the document 322. In various aspects, the definition of the data source model, the definition of the attributes, and the application of the attributes to data from a remote data source can be performed in the same session with the same computing device, different sessions with different computing devices, or some combination thereof As indicated by the examples above, the attribute management application 102 can execute one or more algorithms for defining attributes for a remote data source. FIG. 6 is a flow chart illustrating an example of a process 600 for defining attributes for a remote data source according to some aspects. For illustrative purposes, the process 600 is described with reference to the implementation depicted in FIGS. 1-5. Other implementations, however, are possible.

The process 600 can include providing access to a user interface for defining an entity and an attribute of the entity, as depicted at block 602. For example, one or more processing devices can execute the attribute management application 102 to generate, modify, or otherwise provide a user interface for defining attributes. Examples of various user interfaces are described herein with respect to FIGS. 7-15.

The user interface can elicit inputs from a user for describing data structures used by attributes (e.g., catalogs, entities, properties). For instance, the interface can also include one or more options for defining one or more catalogs, such as the catalog 200 described above with respect to FIGS. 2 and 3. Additionally or alternatively, the interface can include one or more options for defining one or more entities, such as the entities 202, 208 described above with respect to FIGS. 2 and 3. Additionally or alternatively, the interface can include one or more options for defining one or more properties, such as the properties 204, 206, 210 described above with respect to FIGS. 2 and 3.

The attribute management application 102 can provide access to the user interface by a client, such as the client system 120 depicted in FIG. 1. In some aspects, providing access to the user interface involves transmitting data for the user interface from the server system 100 to the client system 120. For example, the attribute management application 102 can configure the online service 104 to provide the user interface in a web page. The online service 104 can receive inputs from the client system 120 via the user interface. In additional or alternative aspects, providing access to the user interface involves transmitting data for the user interface from the server system 100 to a web server or other third-party system that is accessible by the client. For example, the server system 100 can transmit one or more instructions to a web server that cause the web server to present the user interface to the client system 120. The web server can receive inputs from the client system 120 via the user interface and transmit data indicating the user inputs to the server system 100.

The process 600 can also include defining the entity, one or more properties of the entity, and the attribute based on inputs received via the user interface, as depicted at block 604. For example, one or more processing devices can execute the attribute management application 102 to define one or more catalogs, one or more entities, one or more properties, or some combination thereof A catalog can be a data object, such as (but not limited to) a database or a hierarchical data structure, that can include references to child data objects, such as entities or properties. As described above with respect to FIGS. 1 and 2, the catalog can model or otherwise represent a data source that is inaccessible to the server system 100, such as the remote data source 122.

An entity can be a data object, such as (but not limited to) a database or a hierarchical data structure, that can include references to parent data objects, such as a catalog, and to child data objects, such as properties. As described above with respects to FIGS. 1-3, the entity can model or otherwise represent a data segment or other data portion from the data source modeled by a catalog.

A property can be a data object, such as (but not limited to) a database or a hierarchical data structure, that can include references to parent data objects, such as a catalog or entity. As described above with respects to FIGS. 1-3, the property can model or otherwise represent fields from a data structure in the data source that is modeled by a catalog. A property can include data type descriptors indicating data types used by the fields of the data structure.

In some aspects, defined catalogs, entities, and properties (or a subset thereof) can, in combination, provide a hierarchical model of a data source. For example, a catalog can provide a first level in the hierarchical model and can correspond to the data source. Entities can provide a second level in the hierarchical model and can correspond to data segments in the data source (e.g., tables of a database, data satisfying certain query criteria, etc.). Properties can provide a third level in the hierarchical model and can correspond to fields in the data source.

The process 600 can also include receiving, from a remote client, a document with data exported from a remote data source, as depicted at block 606. For example, one or more processing devices can execute the attribute management application 102 to receive a document from a client system 120 or other computing device via a network 118. In some aspects, the document can be uploaded to the server system 100 via a user interface provided by the online service 104. In additional or alternative aspects, the document can be uploaded from the client system 120 to another server system (e.g., a web server) via a user interface, and the other server system can transmit the document to the server system 100.

The process 600 can also include matching the defined entity to the document based on a hierarchy of data elements in the document and the data types of the data elements, as depicted at block 608. For instance, one or more processing devices can execute the attribute management application 102 to perform one or more matching operations.

In some aspects, a match can be identified based on data elements in the document having a hierarchy that corresponds to a hierarchy of a data source model (e.g., one or more of a catalog, an entity, and a property). An example of matching data elements based on their hierarchical arrangement is described above with respect to FIG. 3.

The match can also be identified based on the data elements having data with data types that correspond to the data type descriptors in one or more properties of the data source model. An example of matching data elements based on their data types is described above with respect to FIG. 3. For instance, a data service that is included in or used by the attribute management application 102 can determine that a string value in a data element (e.g., "10:13:02 05 MAY 2016") matches a standard date format (e.g., "hh:mm:ss, dd MMM yyyy"). The data service can classify the data element as having a "date" data type. The data service can match the data element to a property having a "date" data type.

The process 600 can also include mapping the data elements to the properties, as depicted at block 610. For example, one or more processing devices can execute the attribute management application 102 to generate mapping data that identifies a correspondence between one or more data elements and one or more properties in a data source model. An example of the mapping data is described above with respect to FIG. 4.

The process 600 can also include executing the function specified in the attribute using the mapped data as input data, as depicted at block 612. For example, one or more processing devices can execute the attribute management application 102 to execute a function specified by an attribute. An example of executing a function specified by an attribute is described above with respect to FIG. 5.

The process 600 can also include providing the remote client with access to output of the executed function, as depicted at block 614. For example, one or more processing devices can execute the attribute management application 102 to provide the client with access to the output of the executed function. In some aspects, the server system 100 transmits output data to a client system 120 via a data network 118. For example, the online service 104 can present the output data in a user interface, generate a file that is available for download by the client system 120 via a user interface, or perform some other operation that allows the client system 120 to access the output data via the data network. In additional or alternative aspects, the server system 100 transmits the output data to a web server or other server system to which a client system 120 has access.

In additional or alternative aspects, the attribute management application 102 can provide additional functions with respect to the defined attributes. For example, the attribute management application 102 can provide one or more interfaces with capabilities that support the maintenance and administration of attribution based activities and tasks. These capabilities can include one or more of reviewing, adding, editing, and removing definitions, predictors, default values, or other aspects of various attributes, properties, entities, or catalogs. These capabilities can also include generating a project specification document.

Figure 7:
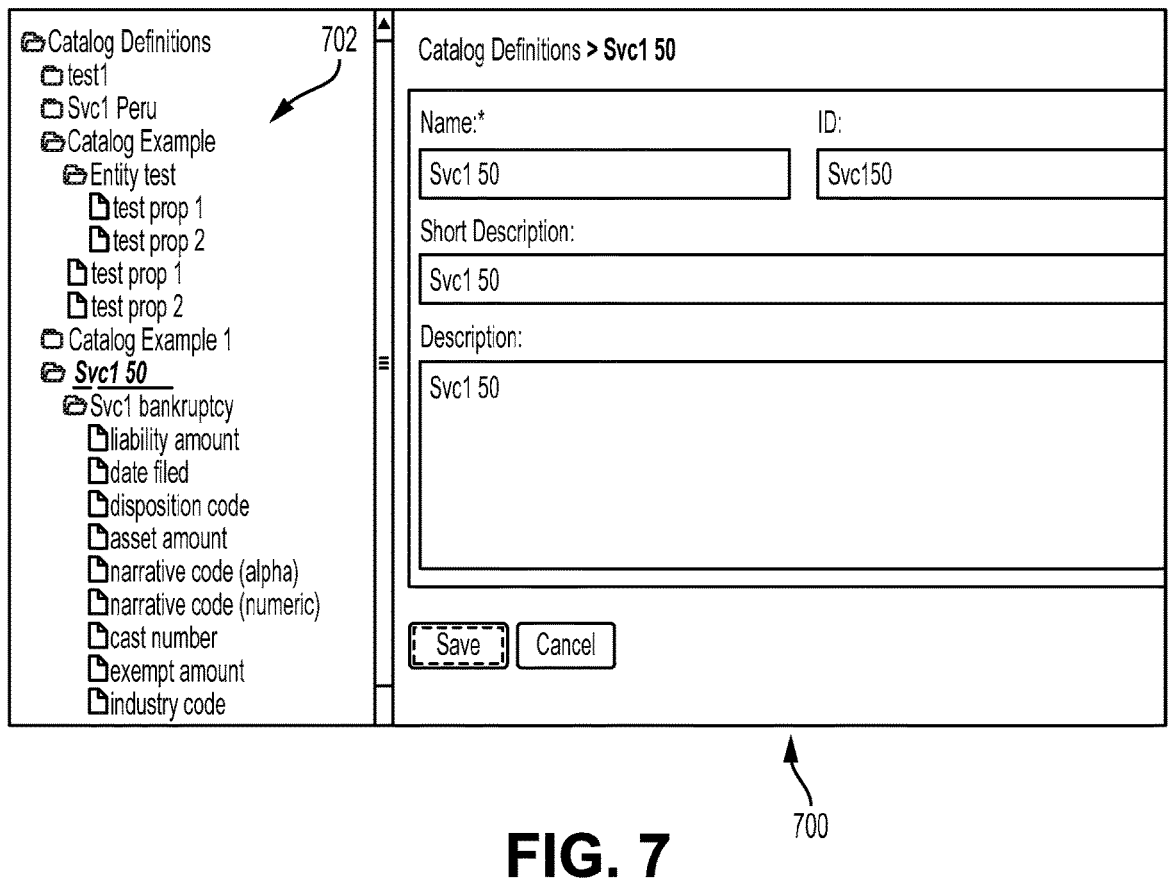
FIG. 7 depicts an example of an interface for viewing information about different catalogs for different modeled data sources, according to some aspects of the present disclosure.
Figure 8:
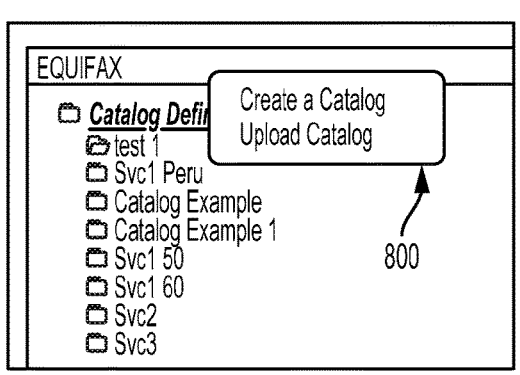
FIG. 8 depicts an example of an interface for generating a catalog for a modeled data source, according to some aspects of the present disclosure.

FIGS. 7-15 depict non-limiting examples of various interfaces used by the attribute management application for enabling the creation of catalogs. FIG. 7 depicts an interface 700 properties of an existing catalog. For example, a catalog name from the list of catalogs in the "Catalog Definitions" section 702 can be clicked. The interface 700 can be updated in response to this input. The updated interface 700 can display fields that contain basic information about the catalog (e.g., "Catalog Name," "Description," etc.). FIG. 8 depicts an example of an interface 800 for selecting a command that creates a new catalog. For example, to create a new catalog, a user can right-click the "Catalog Definitions" link and select the "Create a Catalog" menu option.

Figure 9:
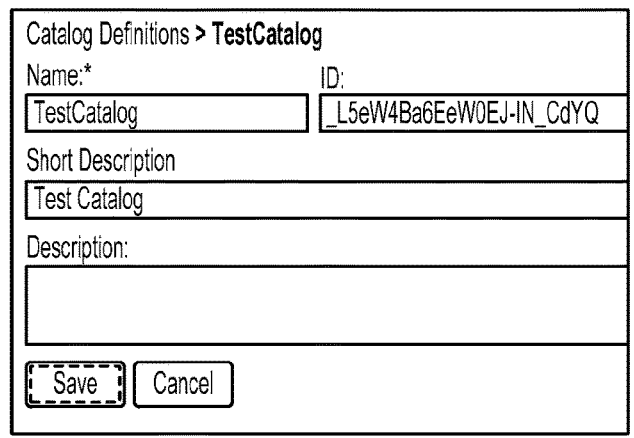
FIG. 9 depicts an example of an interface for adding information about a catalog for a modeled data source, according to some aspects of the present disclosure.

As depicted in FIG. 9, an interface 900 can be displayed in response to selecting the "Create a Catalog" menu option. The interface 900 can allow a user to add basic catalog information. In the example depicted in FIG. 9, this basic information can include a "Name" field for entering a name that a user wants to assign to the catalog, a "Short Description" field for entering a short description for the catalog, and a "Description" field for entering an optional long description for the catalog. The attribute management application can create a new catalog with basic information that has been inputted via the interface 900. The attribute management application 102 can automatically create an identifier for the catalog. This identifier can be displayed in the "ID" of the interface 900. The attribute management application 102 can prevent a user from editing the identifier.

As described above with respect to FIG. 5, the attribute management application 102 can create one or more data services associated with one or more catalog. For example, the data service can be a plug-in that handles reading and parsing data received in a JSON format (e.g., exported data in a document 322) that complies with a catalog that is associated with the data service. In some aspects, the attribute management application 102 can allow a user to specify advanced settings for a data service. For example, the interface 1000 depicted in FIG. 10 may be displayed in response to a command from the user that is received by the attribute management application 102. Clicking the "Add Data Service" button 1002 can cause the attribute management application to display the interface 1100 depicted in FIG. 11.

The interface 1100 can include one or more fields. For example, a "Plugin ID" field can used to specify, display, or otherwise use an identifier of a data service plugin. A "Plugin Version" field can be used to specify or display a version of the data service plugin. A "Format Type" field can be used to specify or select a format that the data service supports (e.g., JSON, Full File Fixed ("FFF"), Extensible Markup Language ("XML"), etc.). For instance, in the example depicted in FIG. 3, a data service 320 that is configured for JSON can analyze JSON documents 322 exported from the remote data source 122, and a data service 320 that is configured for XML can analyze XML documents 322 exported from the remote data source 122.

Continuing with the example depicted in FIG. 11, a "Format Display Name" field can be used to display the name of the format. A "Support Extensions" interface element (e.g., a radio button) can be used to specify whether that particular data service will support the use of extensions. A "Support Projections" interface element (e.g., a radio button) can be used to specify whether the data service will support data projections (e.g., properties having a value that is derived from values of two or more other properties). A "Translator" field can be used to specify or display the translator that interprets the specific format for a plugin. An "ID" field can be used to specify or display an identifier of the translator. A "Version" field can be used to specify or display a version of the translator. The user can enter data into the fields of the interface 1100 and click "Done." In response, the attribute management application 102 can create the data service.

Figure 12:
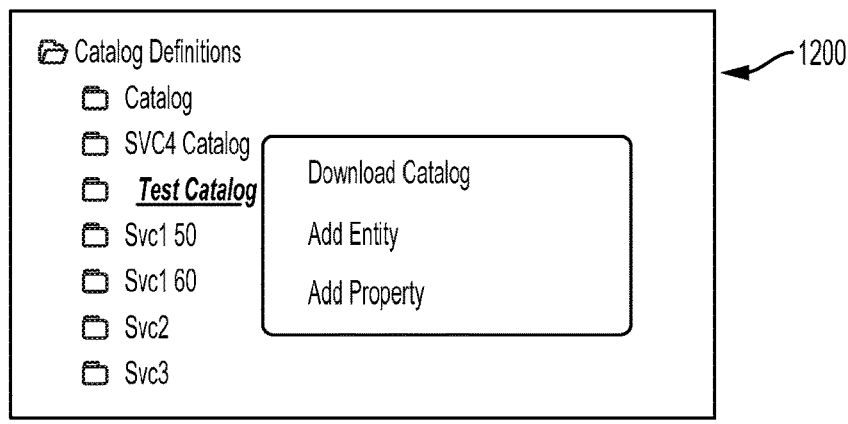
FIG. 12 depicts an example of an interface for adding an entity or property to a catalog for a modeled data source, according to some aspects of the present disclosure.

An example of an interface 1200 for adding entities and properties to a catalog is depicted in FIG. 12. A user can right click on the catalog in the interface depicted in FIG. 12 and select an "Add Entity" menu option or an "Add Property" menu option. Selecting these menu options can cause one of the interfaces depicted in FIG. 13 or 14 to be displayed.

Figure 13:
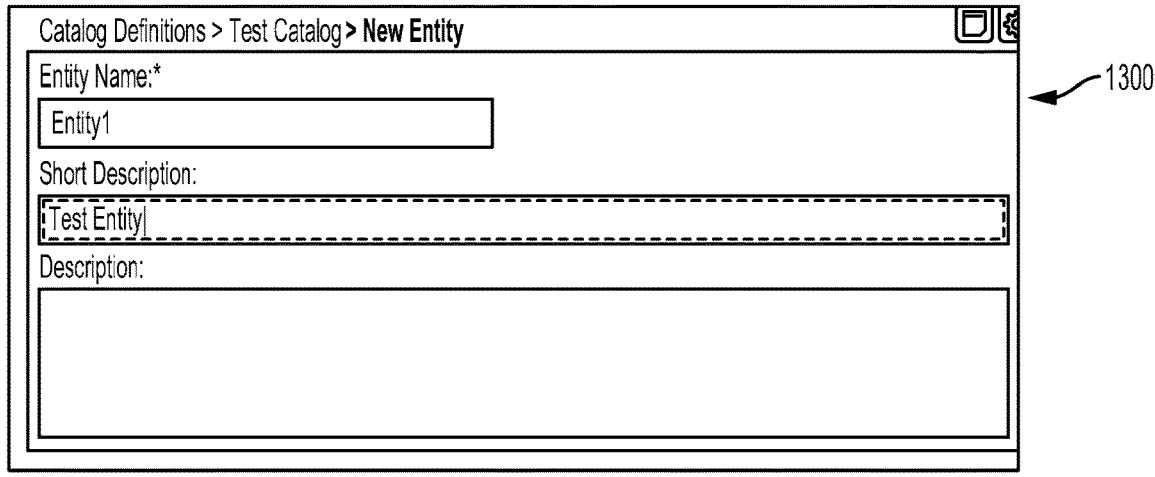
FIG. 13 depicts an example of an interface for configuring an entity of a catalog for a modeled data source, according to some aspects of the present disclosure.

For example, an interface 1300, as depicted in FIG. 13, can display fields for adding information for the entity (e.g., a name, a short description, and a long description). The attribute management application 102 can create an entity with the name that the user entered via the interface 1300. The attribute management application 102 can also generate additional data for the entity. Examples of this additional data include (but are not limited to) one or more of a universally unique identifier for the entity, an asset identifier (e.g., a system-generated identifier for debugging or other internal uses), a controlled object identifier (e.g., a system-generated identifier for debugging or other internal uses), a normalized name for the entity (e.g., with white space removed), and a default language text for JSON or another suitable data format. In some aspects, the attribute management application 102 can provide additional options that allow a user to add language text key/values for additional languages.

Figure 14:
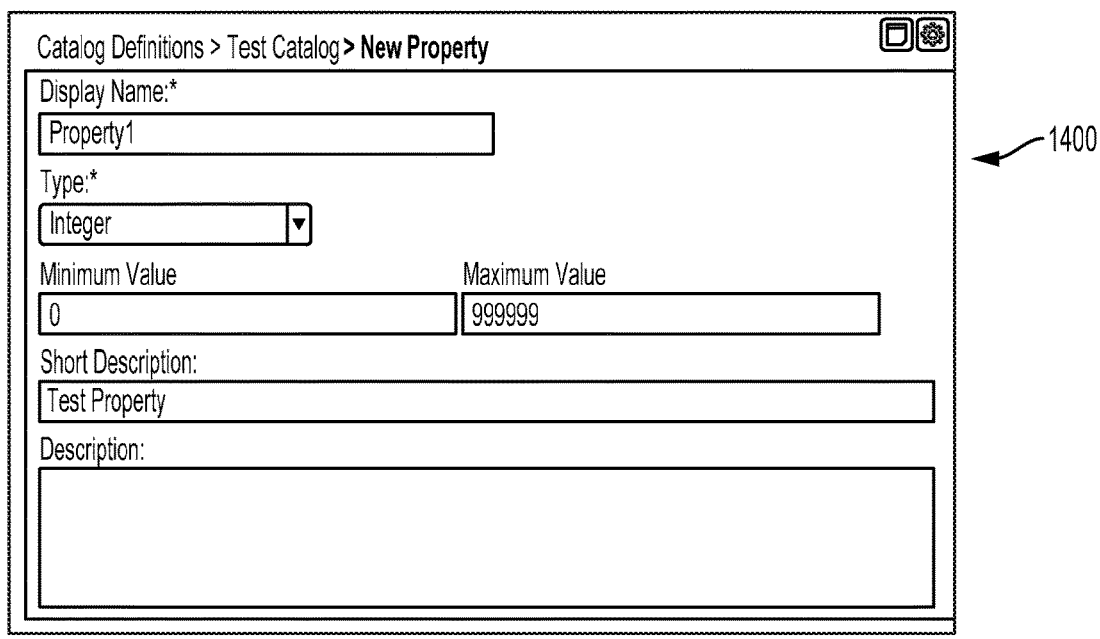
FIG. 14 depicts an example of an interface for configuring adding a property of a catalog for a modeled data source, according to some aspects of the present disclosure.
Figure 15:
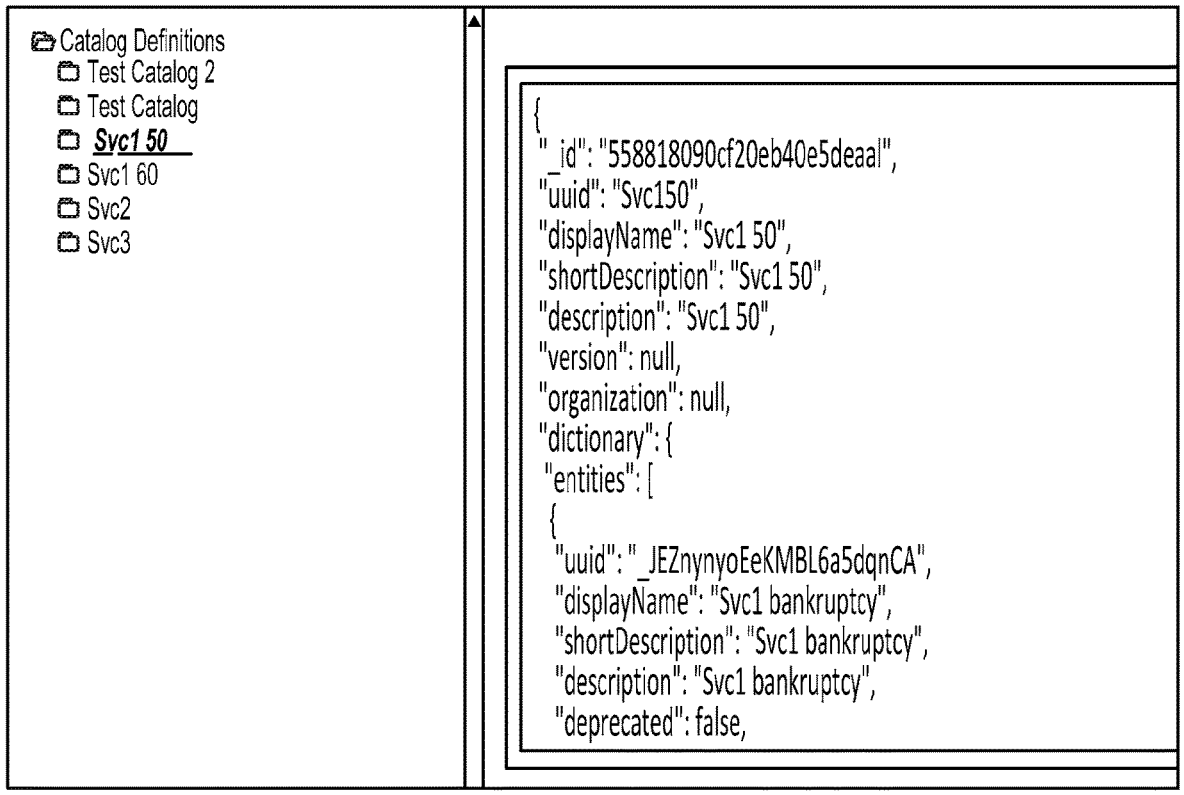
FIG. 15 depicts an example of an interface for displaying a hierarchically formatted document that describes an entity of a modeled data source, according to some aspects of the present disclosure.

An interface 1400 depicted in FIG. 14 can allow properties to be associated with one or more entities. In response to receiving a selection of the "Add Property" menu option in FIG. 12, the attribute management application can display the interface 1400. The interface depicted in FIG. 11 can display one or more of fields to add the basic information for the property. Examples of the field include one or more of a "Name" field identifying the name the user wants to assign to the property, a "Short Description" field for an optional short description for the property, a "Description" field for an optional long description for the property, and a "Type" field that can assign a data type descriptor to the property (e.g., integer).

In some aspects, selecting certain data type descriptors can allow different types of additional information to be added to the property via the interface 1400. For example, as depicted in FIG. 14, selecting an "Integer" data type descriptor can cause the interface 1400 to present additional fields such as "Minimum Value" and "Maximum Value."

In another example, selecting a "float" data type can cause the interface 1400 to present additional fields such as "Minimum Value," "Maximum Value," "Step Size," and "Precision." The attribute management application 102 may enforce certain restrictions for "float" data types. For instance, if one of the fields for "float" is entered, the attribute management application 102 may require that all four fields ("Minimum Value," "Maximum Value," "Step Size," and "Precision") must be completed. If the "Minimum Value" and "Step Size" are defined, then the valid value for a float attribute can be Minimum Value +a multiple of the Step Size.

Other examples of data type descriptors include "Boolean," "Date," and "Text." Selecting "Date" can cause the interface 1400 to display one or more additional fields for identifying a specific date format (e.g., "yyyy-mm-dd," "yyyymmdd," etc.).

In additional or alternative aspects, the attribute management application 102 can provide an interface that allows a user to define data projections. A data projection can be a property having a value that is derived from values of two or more other properties. The attribute management application 102 can validate the data projection based on the aspects of the properties used to define the data projection. For example, if a user selects a data type for a data projection and the properties used to define the data projection use different or incompatible data types, the attribute management application 102 can reject the user's selection or suggest a compatible data type for the data projection.

In some aspects, the attribute management application 102 can configure an interface for defining a data projection based on relevant aspects of the underlying properties used to define a data projection. For example, if a user identifies two properties that are used to derive the value of a data projection, the attribute management application may configure the interface such that the user can only select data types for the data projection that are compatible with the data types of the two identified properties.

In additional or alternative aspects, the attribute management application 102 can generate an interface with options allowing a user to add technical constraints for one or more properties. The technical constraint can be used by the attribute management application 102 to validate attributes that are defined using the described properties for an entity. In one example, the attribute management application 102 can allow a user to add or modify technical constraints via an interface that includes interface elements for receiving the following information:

Language Name—The language to which the constraint applies (e.g. Java, JSON, etc.);

Key—A key for the property being specified (e.g. TRANSLATION_MAP, COUNT_FIELD_FOR_EMPTY_CHECK, VALIDATION FIELD, etc.); and Value—A value for the associated property key (e.g. narrCount, validAssetAmount, caseNumberLength, etc.).

In some aspects, the attribute management application 102 can generate an interface that displays an existing catalog or an element of the catalog in a JSON format or other suitable format. For example, the interface 1500 depicted in depicted in FIG. 15 can be displayed by the attribute management application 102 in response to receiving a command (e.g., "View JSON") on a catalog or a catalog element (e.g., a property, an entity, etc.). The JSON document for a catalog or the selected element can be displayed in a scrollable window in the JSON format.

In some embodiments, attributes can be generated for specific projects. A project can be associated with one or more attributes that are defined or otherwise generated for datasets stored in or obtained from one or more data sources. In some embodiments, the attribute management application can allow a user to extend a catalog for a particular project by adding properties to the catalog for that project. These properties can be used within a given project and can be unavailable in the original catalog or in other projects.

The user can add additional properties either at the catalog level, at the entity level, or both. For example, the attribute management application can present an interface for adding entity-level properties in response to receiving an "Add Property" command at the entity level, and the attribute management application can present an interface for adding catalog-level properties in response to receiving an "Add Property" command at the catalog level respectively. The functionality for adding a property can be implemented in the same manner as described above for entities and catalogs. The properties added for specific projects can be limited to a given project. For example, properties defined for one project and used to write attributes for that project may not be usable for writing attributes in a different project.

In some aspects, attributes that are defined using the attribute management application can be exported as code that is executable by platform-specific data processing systems, such as a client system 120 depicted in FIG. 1 or another data processing system accessible by the client system 120. For example, one or more of the attributes 114 depicted in FIG. 1 or the attributes 212, 214 depicted in FIG. 2 can be exported as C++code, Map-Reduce code, etc. A conversion process executed by the attribute management application 102 can automatically modify aspects of the attributes, so that the attributes' platform-specific characteristics comply with the desired platform (e.g., by using certain data structures, certain data types, etc.). The attribute management application 102 can provide an interface for a user that allows the user to select a platform (e.g., Java, C++, etc.) to which the attribute will be provided. The attribute management application 102 can perform the platform-specific conversion based on the selection of a platform.

In some aspects, the natural language syntax used by the attribute management application 102 to describe attribute functions (e.g., statistical expressions) can be a domain-specific language ("DSL"). A domain-specific language is a small programming language that focuses on a particular domain. For example, the domain can be the functions specified by attributes and performed on a dataset. The attribute management application 102 can generate an abstract syntax tree ("AST") of the user-specified expression using the DSL with, for example, the XText framework. XText is a framework that provides the tools and API to build domain-specific languages. The framework includes a parser, a serializer and code formatter, a scoping framework and the linking, compiler checks, and static analysis (also known as validation). The parser can build the AST, which is a tree-like data structure that represents the syntactic structure of a statistical expression or other function specified in an attribute. The AST can be considered an abstract representation because certain information is captured implicitly in the tree. For example, a logical operator expression using ">" can be denoted by a single node with two branches to represent the left and right operand.

For example, in some aspects, the attribute management application 102 parses each function defined for one or more attributes to generate an AST for each attribute. Once the AST is built, additional information is added to the AST using subsequent processing that obtains additional contextual information (e.g., data service metadata information) to help aid in a code-generation phase. A code generator framework within the attribute management application 102 can be used to implement the code generation phase. For example, the code generator framework can map an AST to a target machine language, such as Java, C++, or Map-Reduce.

The attribute management application can be used to build attributes for any type of information that is useful for marketing or other purposes. Examples of the information include credit-related data, income data, employment data, criminal history, credit score, commercial activity, public record data, and address. Datasets (e.g., JSON objects) can include data elements that include data on an individual or group for a type of information. The data elements can be grouped into subsets based on the type of information, the individual or group, or any other characteristic.

Figure 16:
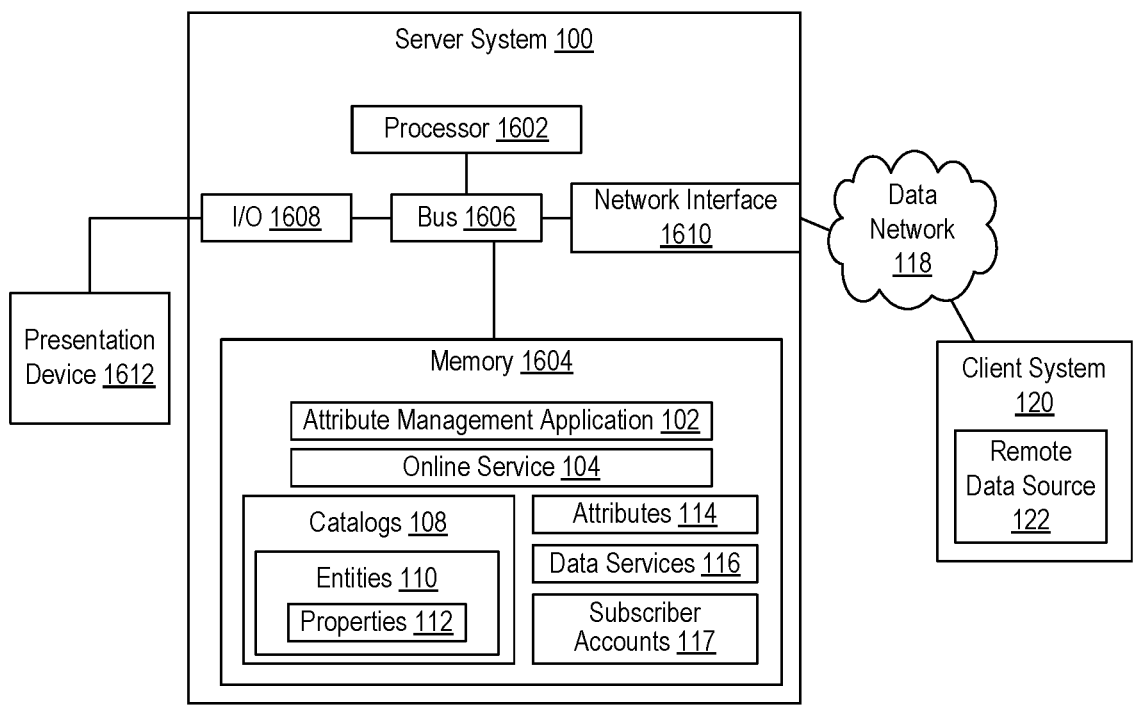
FIG. 16 depicts an example of a computing system for implementing certain features, according to some aspects of the present disclosure.

Any suitable computing system or group of computing systems can be used to perform the operations described herein. For example, FIG. 16 is a block diagram depicting an example of a server system 100 for implementing certain features.

The server system 100 can include a processor 1602 that is communicatively coupled to a memory 1604 and that executes computer-executable program code stored in the memory 1604, accesses information stored in the memory 1604, or both. Examples of a processor 1602 include a microprocessor, an application-specific integrated circuit, a field-programmable gate array, or any other suitable processing device. The processor 1602 can include any number of processing devices, including one. The processor 1602 can include or communicate with a memory 1604 storing program code that, when executed by the processor 1602, causes the processor to perform the operations described in this disclosure.

The memory 1604 can include any suitable computer-readable medium (e.g., the storage medium 106 depicted in FIG. 1). The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, a CD-ROM, DVD, ROM, RAM, an ASIC, magnetic tape or other magnetic storage, or any other medium from which a computer processor can read and execute program code. The program code may include processor-specific program code generated by a compiler or an interpreter from code written in any suitable computer-programming language. Examples of suitable programming language include C, C++, C#, Visual Basic, Java, Python, Perl, JavaScript, ActionScript, etc.

The server system 100 may also include a number of external or internal devices such as input or output devices. For example, the server system 100 is shown with an input/output interface 1608 that can receive input from input devices or provide output to output devices. A bus 1606 can also be included in the server system 100. The bus 1606 can communicatively couple one or more components of the server system 100.

The server system 100 can execute program code that includes the attribute management application 102. The program code for the attribute management application 102 may be resident in any suitable computer-readable medium and may be executed on any suitable processing device. The program code for the attribute management application 102 can reside in the memory 1604 at the server system 100. The attribute management application 102 stored in the memory 1604 can configure the processor 1602 to perform the operations described herein.

The server system 100 can include one or more output devices. One example of an output device is the network interface device 1610 depicted in FIG. 16. A network interface device 1610 can include any device or group of devices suitable for establishing a wired or wireless data connection to one or more data networks 105. Non-limiting examples of the network interface device 1610 include an Ethernet network adapter, a modem, etc. Another example of an output device is the presentation device 1612 depicted in FIG. 16. A presentation device 1612 can include any device or group of devices suitable for providing visual, auditory, or other suitable sensory output indicating recommendations generated by the attribute management application 102. Non-limiting examples of the presentation device 1612 include a touchscreen, a monitor, a speaker, a separate mobile computing device, etc.

General Considerations

Numerous specific details are set forth herein to provide a thorough understanding of the claimed subject matter.

However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification that terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

The invention claimed is:

1. A server system comprising:
a processing device communicatively coupled via a data network to a client system associated with a remote data source that is inaccessible to the server system; and
a non-transitory computer-readable medium storing program code executable by the processing device;
wherein the processing device is configured for executing the program code and thereby performing operations comprising:
providing access to a user interface by the client system, the user interface having an entity-definition option and an attribute-definition option,
defining, based on user inputs received via the user interface and independently of accessing the remote data source, a model of the remote data source, the model comprising a defined entity that is defined using the entity-definition option and a defined attribute that is defined using the attribute-definition option, the defined entity representing a data segment from the remote data source and having properties representing fields of a data structure stored in the remote data source, the properties having data type descriptors indicating data types used by the fields of the data structure, the defined attribute specifying a function and specifying the properties as inputs to the function,
matching, to a document that is subsequently received from the client system and comprising data exported from the remote data source, the defined entity, wherein the matching is based on data elements in the document being arranged in a hierarchy corresponding to the properties and the data elements having the data types corresponding to the data type descriptors, wherein the processing device is configured for matching the defined entity to the document by performing additional operations comprising:
(a) identifying a first parent-child relationship between the defined entity and a subset of the properties,
(b) identifying a second parent-child relationship between an object in the document and a subset of the data elements in the document,
(c) determining that the first parent-child relationship is similar to the second parent-child relationship,
(d) identifying data types for the subset of the data elements, and
(f) determining that the subset of the properties with the first parent-child relationship to the defined entity have respective data type descriptors indicating the identified data types for the subset of the data elements,
executing, based on matching the document to the defined entity, the function specified in the defined attribute using, as input data, the data elements mapped to the properties, and
configuring a network interface device to transmit an output of the executed function to the client system.

2. The server system of claim 1, wherein the user inputs comprise natural language inputs or near-natural language inputs, wherein the defined attribute is defined via the natural language inputs or near-natural language inputs, wherein the processing device is further configured for converting the defined attribute into program code for performing the function specified in the defined attribute, wherein the processing device is configured for executing the function by executing the program code.

3. The server system of claim 2, wherein the processing device is further configured for identifying a software platform used by at least one of the client system or a data-processing system usable by the client system for accessing the remote data source, wherein the program code is compatible with the identified software platform.

4. The server system of claim 1, wherein the model comprises a hierarchical data structure in which the defined entity is located at a first hierarchical level and the properties are located at a second hierarchical level.

5. The server system of claim 1, wherein the processing device is further configured for:
   identifying a format for data to be received from the remote data source; and
   generating, based on the identified format, a data service for matching documents having the format to the defined entity, wherein the data service is executed to perform the matching in response to receiving the document from the client system.

6. The server system of claim 1, wherein the function comprises at least one of:
   setting a default data element value based on an input data value corresponding to at least one of the properties; or
   performing a statistical operation on input data values corresponding to the properties.

7. A method comprising:
   providing, by a server system, access to a user interface by a client system, the user interface having an entity-definition option and an attribute-definition option;
   defining, by the server system and based on user inputs received via the user interface, a hierarchal model of a remote data source that is inaccessible to the server system, the hierarchal model comprising a defined entity that is defined using the entity-definition option and a defined attribute that is defined using the attribute-definition option, the defined entity located at a first hierarchical level and representing data from the remote data source, the defined entity having properties representing fields of a data structure stored in the remote data source, the properties located at a second hierarchical level and having data type descriptors indicating data types used by the fields of the data structure, the defined attribute specifying a function and specifying the properties as inputs to the function;
   receiving, from the client system and subsequent to defining the hierarchical model, a document comprising data exported from the remote data source;
   matching the defined entity to the document based on data elements in the document being arranged in a hierarchy corresponding to the properties and the data elements having the data types corresponding to the data type descriptors, wherein matching the defined entity to the document comprises:
      identifying a first parent-child relationship between the defined entity and a subset of the properties,
      identifying a second parent-child relationship between an object in the document and a subset of the data elements in the document,
      determining that the first parent-child relationship is similar to the second parent-child relationship,
      identifying data types for the subset of the data elements, and
      determining that the subset of the properties with the first parent-child relationship to the defined entity have respective data type descriptors indicating the identified data types for the subset of the data elements;
   mapping, based on matching the document to the defined entity, the data elements to the properties;
   executing, by the server system, the function specified in the defined attribute using data from the mapped data elements as input data; and
   transmitting an output of the executed function to the client system.

8. The method of claim 7, wherein the user inputs comprise natural language inputs or near-natural language inputs, wherein the defined attribute is defined via the natural language inputs or near-natural language inputs, and further comprising converting the defined attribute into program code for performing the function specified in the defined attribute, wherein executing the function comprises executing the program code.

9. The method of claim 8, further comprising identifying, by the server system, a software platform used by at least one of the client system or a data-processing system usable by the client system for accessing the remote data source, wherein the program code is compatible with the software platform.

10. The method of claim 9, further comprising transmitting the program code to the client system for execution at the client system or the data-processing system.

11. The method of claim 7, further comprising:
   identifying, by the server system, a format for data to be received from the remote data source; and
   generating, based on the identified format, a data service for matching documents having the format to the defined entity, wherein the data service is executed to perform the matching in response to receiving the document from the client system.

12. The method of claim 7, wherein the function comprises at least one of:
   setting a default data element value based on an input data value corresponding to at least one of the properties; or
   performing a statistical operation on input data values corresponding to the properties.

13. A non-transitory computer-readable medium having program code that is executable by a processing device to cause a computing device to perform operations, the operations comprising:
   providing access to a user interface by a client system, the user interface having an entity-definition option and an attribute-definition option;
   defining, based on user inputs received via the user interface, a model of a remote data source that is inaccessible to a computing system defining the model, the model comprising a defined entity that is defined using the entity-definition option and a defined attribute that is defined using the attribute-definition option, the defined entity representing data from the remote data source that is inaccessible to the computing system used for defining the defined entity and the defined attribute, the defined entity having properties representing fields of a data structure stored in the remote data source, the properties having data type descriptors indicating data types used by the fields of the data structure, the defined attribute specifying a function and specifying the properties as inputs to the function;
   receiving a document comprising data exported from the remote data source;
   matching the defined entity to the document based on data elements in the document being arranged in a hierarchy corresponding to the properties and the data elements having the data types corresponding to the data type descriptors, wherein matching the defined entity to the document comprises:
      identifying a first parent-child relationship between the defined entity and a subset of the properties, identifying a second parent-child relationship between an object in the document and a subset of the data elements in the document, determining that the first parent-child relationship is similar to the second parent-child relationship, identifying data types for the subset of the data elements, and determining that the subset of the properties with the first parent-child relationship to the defined entity have respective data type descriptors indicating the identified data types for the subset of the data elements;

mapping, based on matching the document to the defined entity, the data elements to the properties;

executing the function specified in the defined attribute using data from the mapped data elements as input data; and transmitting an output of the executed function to the client system.

14. The non-transitory computer-readable medium of claim 13, wherein the user inputs comprise natural language inputs or near-natural language inputs, wherein the defined attribute is defined via the natural language inputs or near-natural language inputs, wherein the operations further comprise converting the defined attribute into program code for performing the function specified in the defined attribute, wherein executing the function comprises executing the program code.

15. The non-transitory computer-readable medium of claim 14, wherein the operations further comprise identifying a software platform used by at least one of the client system or a data-processing system usable by the client system for accessing the remote data source, wherein the program code is compatible with the software platform.

16. The non-transitory computer-readable medium of claim 15, wherein the model comprises a hierarchical data structure in which the defined entity is located at a first hierarchical level and the properties are located at a second hierarchical level.

17. The non-transitory computer-readable medium of claim 13, wherein the operations further comprise:

identifying a format for data to be received from the remote data source; and generating, based on the identified format, a data service for matching documents having the format to the defined entity, wherein the data service is executed to perform the matching in response to receiving the document from the client system.

* * * * *